United States Patent
Larsson et al.

(10) Patent No.: US 6,463,307 B1
(45) Date of Patent: Oct. 8, 2002

(54) METHOD AND APPARATUS FOR POWER SAVING IN A MOBILE TERMINAL WITH ESTABLISHED CONNECTIONS

(75) Inventors: Mikael Larsson, Dormer Park (SG); Peter Larsson, Euro Asia View (SG)

(73) Assignee: Telefonaktiebolaget LM Ericsson (SE)

( * ) Notice: Subject to any disclaimer, the term of this patent is extended or adjusted under 35 U.S.C. 154(b) by 0 days.

(21) Appl. No.: 09/134,738

(22) Filed: Aug. 14, 1998

(51) Int. Cl.[7] .............................. H04B 1/38; H04M 1/00
(52) U.S. Cl. ....................... 455/574; 455/343; 455/575; 455/67.1; 455/67.4; 455/422; 455/424
(58) Field of Search .................................. 455/422, 424, 455/425, 67.1, 67.4, 343, 574, 575

(56) References Cited

U.S. PATENT DOCUMENTS

| | | | | |
|---|---|---|---|---|
| 5,128,938 A | * | 7/1992 | Borras ........................ | 370/95.1 |
| 5,710,975 A | | 1/1998 | Bernhardt et al. | |
| 5,799,256 A | * | 8/1998 | Pombo et al. ............... | 455/574 |
| 5,883,885 A | * | 3/1999 | Raith ......................... | 370/33.1 |
| 5,903,552 A | * | 5/1999 | Raith ......................... | 370/337 |
| 5,940,771 A | * | 8/1999 | Gollnick et al. ............ | 455/517 |
| 5,991,618 A | * | 11/1999 | Hall ............................ | 455/425 |
| 6,018,661 A | * | 1/2000 | Raith et al. ................. | 455/437 |
| 6,192,230 B1 | * | 2/2001 | Van Bokhorst et al. ..... | 455/343 |

FOREIGN PATENT DOCUMENTS

| | | |
|---|---|---|
| WO | 90/10987 | 9/1990 |
| WO | 96/27993 | 9/1996 |

OTHER PUBLICATIONS

Technical Committee, "Integrated Local Management Interface (ILMI) Specification Version 4.0", Jul. 1996, pp. 1–35.

CEC Deliverable No: 3DI, Title of Deliverable: Wireless ATM MAC Overall Description, pp. 88–94.

IEEE P802. 11 Draft Standard for Wireless LAN Medium Access Control (MAC) and Physical Layer (PHY) Specification, May 9, 1997, pp. 141–150.

* cited by examiner

Primary Examiner—Edward F. Urban
Assistant Examiner—Marceau Milord
(74) Attorney, Agent, or Firm—Burns, Doane, Swecker & Mathis, L.L.P.

(57) ABSTRACT

Power consumption of a mobile terminal is reduced by providing a system wherein a base station specifies a time period, at the end of which a mobile terminal that is hibernating in a power-saving mode will listen for paging messages from the base station. If no paging messages are present, then the mobile terminal continues hibernating, thus conserving battery power by not communicating with the base station. Either the base station or the mobile terminal can initiate a process to transfer the mobile terminal from an awake mode to a hibernating mode. In accordance with another embodiment of the invention for use in systems that require frequent connectivity testing, an agent can be provided within the base station to answer connectivity test inquiries on behalf of the mobile terminal. The mobile terminal can communicate periodically with the base station to update information that the agent uses to respond to the test inquiries.

9 Claims, 10 Drawing Sheets

METHOD AND APPARATUS FOR POWER SAVING IN A MOBILE TERMINAL WITH ESTABLISHED CONNECTIONS

FIELD OF THE INVENTION

The present invention relates to communication networks having mobile wireless terminals. In particular, the present invention relates to management of power consumption of mobile wireless terminals having an active communication connection.

BACKGROUND OF THE INVENTION

In a public asynchronous transfer mode (ATM) network, charging of unspecified bit rate (UBR) connections and perhaps also available bit rate (ABR) connections will most likely either be based on the traffic volume of the connections or on a fixed subscription fee, instead of the traditional charging based on time duration of a session or connection. Volume based charging as well as a fixed subscription fee arrangement provide incentives for users to change their usage behavior. For example, instead of placing short and concise phone calls, users may keep telecommunication connections established for long periods of time, while sending and receiving data infrequently so that the average bandwidth utilization is low. Many new types of applications may arise, that allow users to explore the feature of having constant connectivity, i.e., a continuous connection, that is free where the users pay only when data is transferred across the connection. For such connections, when the users have low average usages long periods of time can elapse between consecutive data packet transmissions.

A private ATM network can also provide users with the option of keeping connections to various servers established for long periods of time. After the initial connection is established, a user can have constant connectivity to a file server, mail server, etc. A mail tool can then poll the POP account on behalf of the user at intervals such as 10–15 minutes, without any need to re-establish a connection each time. Thus, where communication is via modem, repetition of the dial-up process can be avoided. Similarly, a user's word processor can auto-save current document versions at regular intervals (e.g., every 10 minutes) on the file server without having to re-establish a connection each time. In such situations ATM connections can remain established for long periods of time, even when the average usage of such connections is very low.

Figure 1:
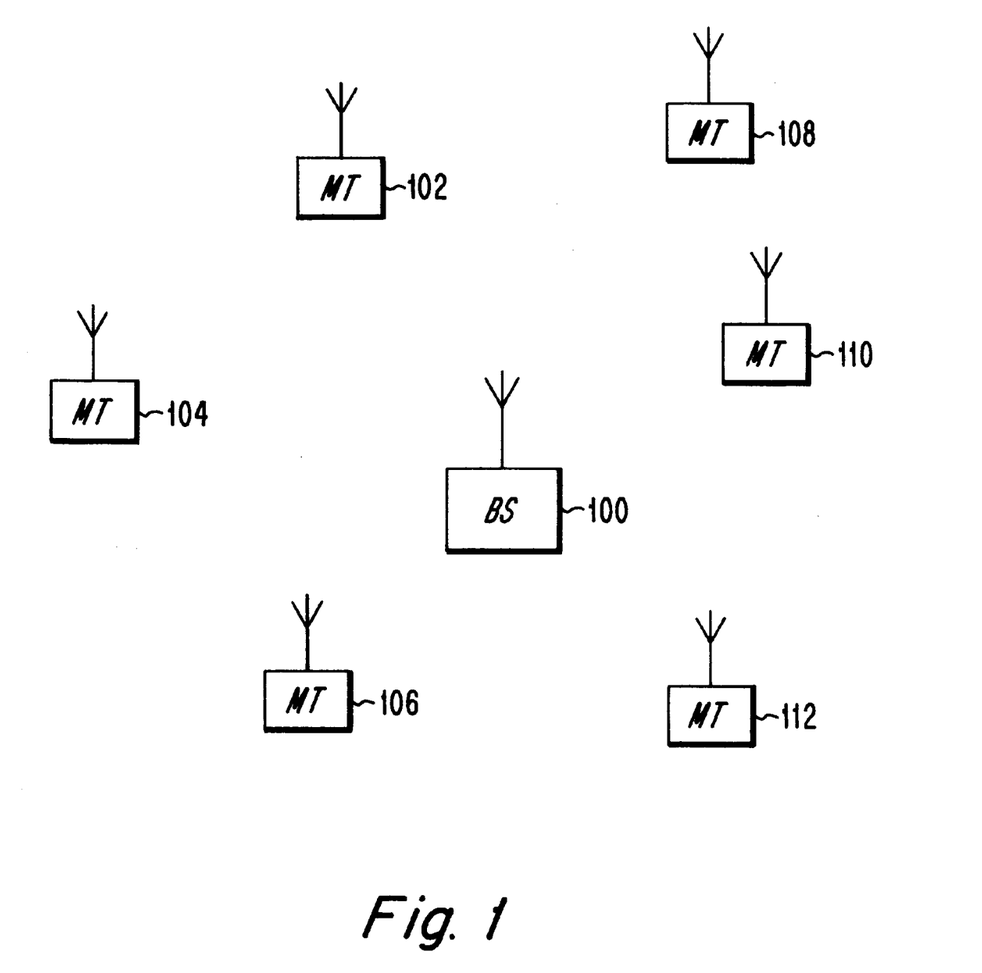
FIG. 1 shows a communication system having a BS and multiple MT's, that can incorporate embodiments of the present invention.

Since TCP/IP provides a connection-less transport service, most local area network (LAN) applications take the connectivity to various servers for granted without any preceding dial-up service. To offer LAN applications and ATM applications the same transport service in a wireless LAN (WLAN) or a wireless ATM (WATM) network, a mobile terminal in the network should keep its communication connection(s) established for long periods of time. However, this tends to increase power consumption of the mobile terminal, which may have a finite and thus time-limited power supply such as a battery. Accordingly, it is important to ensure that the mobile terminal saves power whenever it has no data to receive or transmit. FIG. 1 shows an exemplary system with a base station (BS) and multiple mobile terminals (MT) 102–112.

Conventional cellular mobile systems normally support some mechanisms or procedures that enable the mobile terminal to save some battery power. For example, a paging mechanism enables the mobile terminal to enter a power-saving mode while it is inactive, i.e., when it has no communication connection established. An "inactive" mobile terminal regularly listens to a paging channel at specified time intervals, but in between times it turns off its receiver ands sleeps or hibernates.

Figure 2:
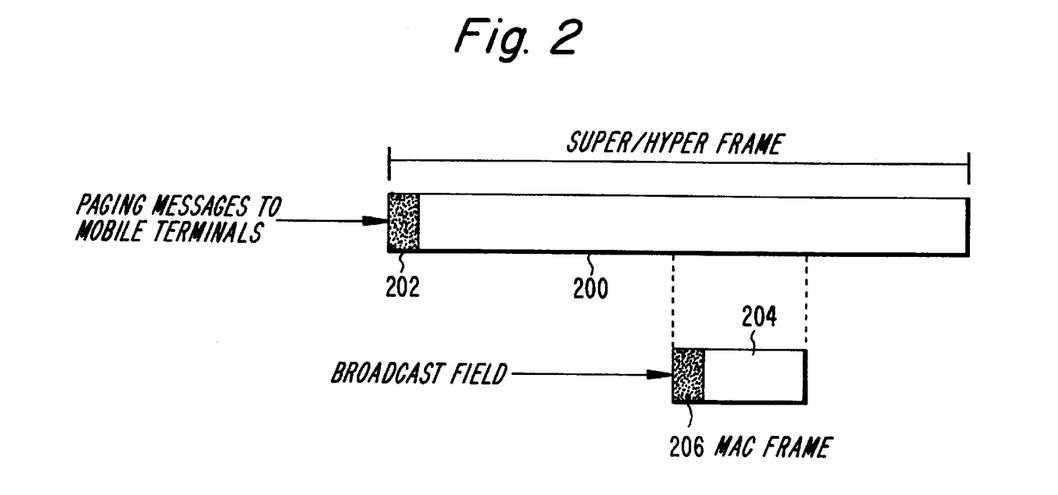
FIG. 2 shows a DLC frame structure including a superframe.

Paging in a WLAN or WATM system can be sent on a fixed frame basis, or on a superframe basis where the superframe contains multiple frames. In the beginning of each superframe, the BS has the opportunity to page one or several mobile terminals. The mobile terminals can be divided into paging groups in order to enable them to sleep or hibernate for a longer time than the duration of a superframe. As shown in FIG. 2, an exemplary downlink channel (DLC) frame structure has a superframe 200 which conveys paging messages in its header 202. Within the body of the superframe 200 are individual frames such as medium access control (MAC) frames 204, each of which can have a broadcast field 206 that provides information about the contents of the individual frame 204. The MAC protocol is described in greater detail in copending application Ser. No. 09/046,652, which is hereby incorporated by reference. A hibernating terminal may wake up for every nth superframe to check for a paging message. Where multiple mobile terminals are organized into groups, the mobile terminals in each group can be organized to wake up for the same superframe, and different groups wake up for different superframes. The DLC frame structure allows mobile terminals to sleep for short periods of time during transmission of certain parts of the frame, so that an active terminal will only have to stay awake to receive the various headers and broadcast fields of the DLC frames, as well as to receive packets directed to the active terminal and transmit packets.

Although conventional cellular mobile systems can provide a paging mechanism as described above to save battery power in inactive mobile terminals, and although there are methods available to enable active terminals to sleep for short intervals, (for example during parts of a superframe), these solutions lack methods to enable active terminals with established connections to sleep or hibernate for long periods of time.

In the IEEE 802.11 specification (which is hereby incorporated by reference) there is a power saving procedure for active terminals (i.e., terminals with established connections). Whenever a terminal decides to enter or exit the power saving mode, it informs the BS. When the terminal is in the power saving mode, the BS buffers all incoming packets designating the terminal. If the buffer in the BS overflows, the excess packets are discarded. The maximum duration of the power saving (or sleeping/hibernating) mode is determined by the terminal itself.

In a "Magic Wand" specification (which is hereby incorporated by reference), there is a power saving procedure for terminals with established connections. The terminal itself decides when and for how long it will sleep or hibernate. The terminal can determine the sleep duration based on the quality of service (QOS) of its established connections. Whenever a terminal enters a power saving mode in which it sleeps, it informs the BS about the duration of the sleep.

Both the IEEE 802.11 specification and the Magic Wand specification allow an active terminal to enter a power saving mode. When the terminal is in the power saving mode, the BS buffers packets designated for the terminal until the terminal exits the power saving mode. Thus, an optimum sleep duration time for the terminal depends to some extent on the buffering capacity of the BS. Since the BS knows its buffering capacity but the terminal decides the sleep duration time instead of the BS, the terminal sleep duration time is likely to be sub-optimal.

Furthermore, the power saving methods of the IEEE 802.11 and the Magic Wand specifications each require that a terminal send a message to the BS every sleeping period. For example, in accordance with the Magic Wand specification, the terminal indicates to the BS that it will sleep for "X" milliseconds. When the X millisecond time period expires, the terminal must awaken to check for any downlink packets to receive. In many cases the terminal will find that it had no packet to receive, and it will then decide to enter the power-saving sleep mode again. However, before the terminal can return to the power-saving mode it must inform the BS how long it will sleep. The transmission of the "sleep" message and the reception of a response from the BS will consume battery power.

SUMMARY OF THE INVENTION

In accordance with an embodiment of the invention, power consumption of a mobile terminal can be further reduced by providing a system wherein a hibernating mobile terminal remains hibernating in a hibernation state until it either a) hears a paging message from a BS, or b) determines that it has a data packet to send to the BS. At the end of a time interval or time period specified by the BS, the hibernating mobile terminal listens for a paging message. During the time period the mobile terminal does not listen for paging messages. In other words, the BS specifies how often the hibernating mobile terminal will listen for paging messages. For example, the mobile terminal can listen for paging messages every "N" superframes, where N is a non-zero integer. If there are no paging messages when the mobile terminal listens, and if the mobile terminal has no packets to send to the BS, then the mobile terminal restarts the time period and continues to hibernate.

In accordance with another embodiment of the invention, the BS can send a paging message to the mobile terminal and then, after the mobile terminal awakens, changes from the hibernation state to an awake state, and acknowledges the paging message, the BS can send a packet containing hibernation instructions and a new, specified time period or frequency at which to listen for paging messages. In other words, the system can be configured so that the mobile terminal will continue behaving in a specified manner until the BS sends instructions to change the behavior of the mobile terminal.

In accordance with another embodiment of the invention, when the mobile terminal is awake, it can send a hibernation request to the BS, which will then respond with specific instructions including a time interval or frequency at which the mobile terminal should listen for paging messages from the base station. In accordance with another embodiment of the invention, when the mobile terminal determines while it is hibernating in a power-saving mode (i.e., the hibernation state) that it has a packet to send to the BS, it can awaken using its own volition to change from the hibernation state to the awake state and send a capacity request signal to the BS to initiate transfer of the packet from the mobile terminal to the BS.

In accordance with another embodiment of the invention, in systems that require frequent connectivity testing an agent can be provided in the BS to answer connectivity test inquiries on behalf of the mobile terminal. The mobile terminal can communicate periodically with the BS to update information the agent uses to respond to the test inquiries, while remaining in the hibernation state.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

In accordance with an embodiment of the invention, where the BS sends paging messages less frequently than every MAC frame, for example, every "X" superframes where X is a non-zero integer, the paging messages can be used to notify a mobile terminal that the BS has packets to send to the mobile terminal. Thus, the mobile terminal can enter a power-saving sleep or hibernation state for an extended period of time according to a defined procedure, whenever the mobile terminal has no data to receive or to transmit, but still with communication connections established. When a specified time period expires, the hibernating mobile terminal listens for paging messages from the BS. If paging messages are present, then the mobile terminal awakens, changes to the awake state, acknowledges the paging message, and begins receiving data from the BS. The BS considers the mobile terminal to have awakened and changed from the hibernation state to the awake state when it receives a paging message acknowledge signal from the mobile terminal. Thus, when the mobile terminal is hibernating, the BS can buffer data packets for the mobile terminal, and then send a paging message during the time the mobile terminal listens, so that the paging message will cause the mobile terminal to awaken and receive the data packets. If the mobile terminal is already in the awake state when the BS receives or generates a data packet for transfer to the mobile terminal, then the BS can send the data packet directly without sending a paging message and receiving a paging message acknowledge signal.

When the mobile terminal is in the awake state, it can send a hibernation request to the BS on its own initiative, or it can send a hibernation request to the BS in response to a hibernation proposal from the BS. In response to a hibernation request, the BS can send a response that specifically instructs the mobile terminal to begin hibernating, i.e., change from the awake state to the hibernation state. The response can include hibernation parameters for the mobile terminal to comply with. The parameters can include, for example, a time period at the end of which the hibernating mobile terminal should listen for paging messages, as well as instructions as to how the mobile terminal should proceed at the end of the time period. For example, the BS can instruct the mobile terminal to continue hibernating and restart the time period if no paging messages are present when the mobile terminal listens for paging messages. This cycle can be repeated until the mobile terminal determines that it has a data packet to send to the BS, or until it hears a paging message from the BS. The BS can send new hibernation instructions to the mobile terminal by sending a paging message when the mobile terminal is listening, and sending a subsequent data packet to the mobile terminal that contains new instructions. For example, the new instructions can include a different time period or listening frequency which the mobile terminal should use while hibernating. As a further alternative, if the mobile terminal determines while it is in the hibernation mode that it has a data packet to transmit to the BS, then the mobile terminal can either awaken immediately and send a capacity request signal to the BS to begin the process of transferring the data packet to the BS, or it can wait until the hibernation time period expires before doing so. The BS will consider the mobile terminal to be awake when it receives a capacity request signal from the mobile terminal.

Generally speaking, as long as the BS considers the terminal to be in the "hibernation" state, the terminal can perform various operations such as listening for paging messages, sending report messages such as an interim local management interface (ILMI) Mirror update to the BS, and the like without any preceding interaction with the BS. In an ILMI system, the mobile terminal must respond to frequent connectivity messages. In accordance with an embodiment of the invention described in greater detail further below, an ILMI agent can be provided within the BS to respond to the connectivity messages on behalf of the mobile terminal, and to periodically receive updated status information regarding the mobile terminal via ILMA Mirror update messages from the mobile terminal.

Of course, in general the mobile terminal must turn on its radio receiver to listen, and must turn on its radio transmitter to send a report message, but as long as the BS considers the terminal to be in the hibernation state, the terminal can immediately return to its sleep, i.e., to a quiescent level within the hibernation state. Generally, any communication with the BS that can be omitted will reduce power consumption of the mobile terminal. In addition, when the mobile terminal changes from one state to another state, the new state is not functional or operative until the base station recognizes that the mobile terminal is in the new state. This is because the mobile terminal's state determines how the mobile terminal and the base station interact; the mobile terminal and the base station cannot interact according to the rules of interaction associated with the mobile terminal's new state, until the base station is aware that the mobile terminal is in the new state. Specific kinds of signals from the mobile terminal can alert the base station that the mobile terminal is in a new state. For example, a paging acknowledge signal or a capacity request signal from the mobile terminal can alert the base station that the mobile terminal is in the awake state. The base station can also assume that after it has received a hibernation request from the mobile terminal and has sent a response to the hibernation request, the mobile terminal is in the hibernation mode.

Figure 3:
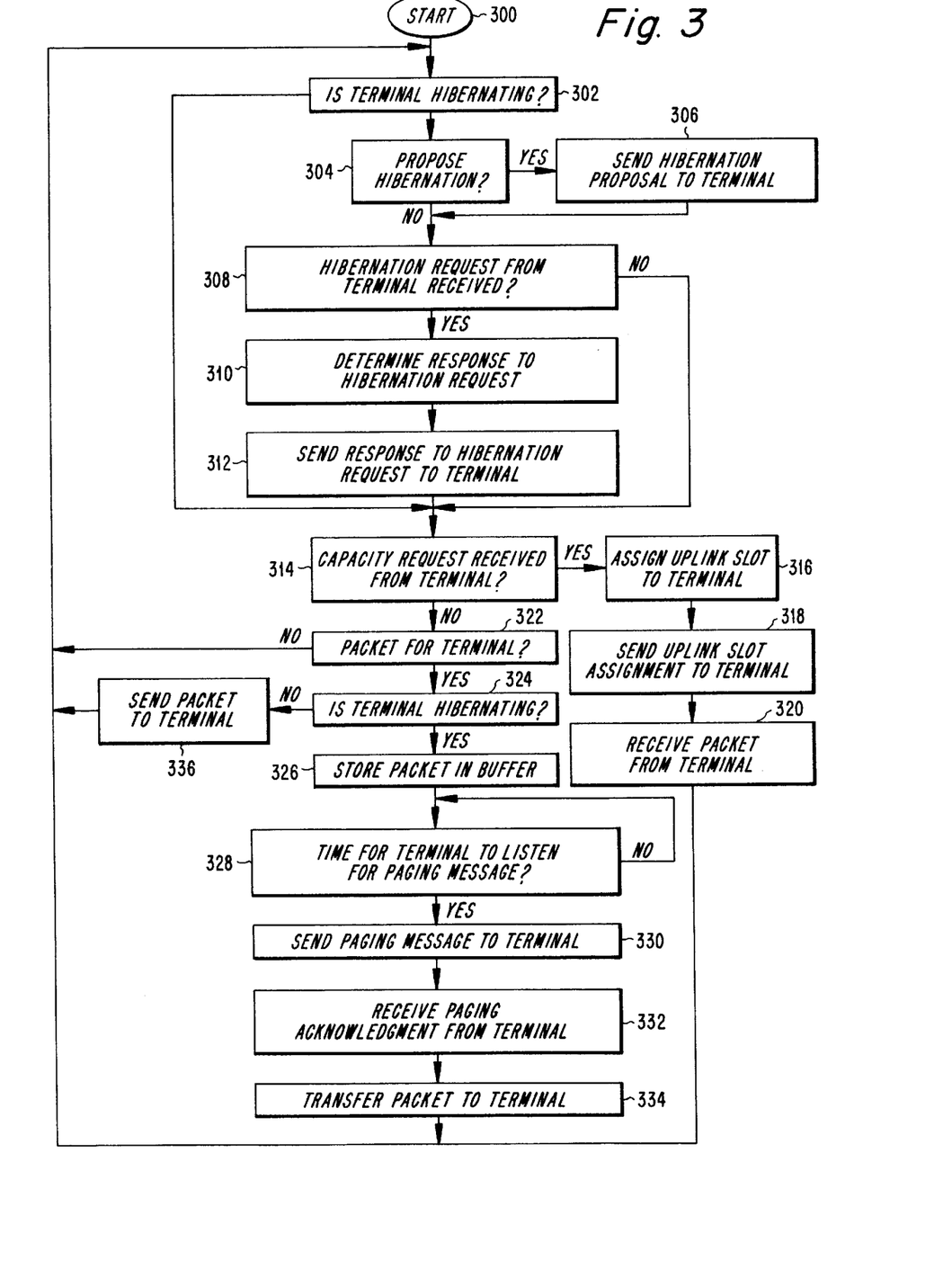
FIG. 3 shows a flow diagram of BS functions in accordance with an embodiment of the invention.

In particular, FIG. 3 illustrates a set of BS actions with respect to a specific mobile terminal, for an embodiment of the invention. As shown in FIG. 3, the BS begins with step 300 and proceeds to step 302, where it determines whether the mobile terminal is hibernating. If the mobile terminal is not hibernating, then the BS proceeds to step 304 where it determines whether to propose hibernation to the mobile terminal. If the BS decides to send a hibernation proposal to the mobile terminal, then it proceeds to step 306 where it sends a hibernation proposal to the mobile terminal. After sending the hibernation proposal, the BS proceeds to step 308. If at step 304 the BS decides not to send a hibernation proposal, then it proceeds to step 308. At step 308, the BS determines whether a hibernation request has been received from the mobile terminal. If a hibernation request has been received, then the BS proceeds from step 308 to step 310, where it determines a response to the hibernation request.

The response determined in step 310 can include, for example, a time period which indicates how often the mobile terminal should check for a paging message. The time period can be selected so that a terminal checks for paging messages every Nth superframe, where N is a non-zero integer. The BS can determine the response to the hibernation request based on, for example, the traffic contract of established connections, an experienced traffic load, the total number of hibernating mobile terminals that the BS is responsible for communicating with, and an available buffering capacity within the BS. In addition, the time period can be selected based on quality of service (QOS), so that where a first mobile terminal has an established connection with a first QOS that is different from a second QOS of a second mobile terminal, the time period for the first mobile terminal can be different from the time period for the second mobile terminal, based on the difference in QOS. Where a mobile terminal has multiple connections established, each with a different QOS, the time period can be chosen in accordance with the most stringent QOS. There can also be timeliness and power savings tradeoffs; for example, if the mobile terminal listened infrequently for paging messages, the power savings would be greater. However, the time between contacts would also be longer, resulting in an increased transfer delay for downlink packets and/or an increased required buffering capacity of the BS. Thus, the BS can also choose hibernation parameters based on an appropriate trade-off between power savings on the one hand and acceptable transfer delays and/or a minimum required buffering capacity on the other hand. The hibernation parameters can include information that tells the mobile terminal when to begin the time period, and a length of the time period. For example, the hibernation parameters can include information about an "Initial Frame" number and a "Distance" between two consecutive checks for a paging message (i.e., a time period or interval at the end which the mobile terminal should listen for paging messages). The Initial Frame indicates the sequence number of the first superframe, so that at that superframe the mobile terminal will check for a paging message. The Distance indicates how often the terminal will wake up and check for a paging message. The Distance can be expressed in terms of a number of frames, for example an integer number of superframes, or can, for example, be expressed directly as an amount of time, for example a number of milliseconds. A time value can also be used instead of the Initial Frame. For example, an initial wait time period can be provided, which starts at a specified time. The specified time can be, for example, the time at which the mobile terminal receives the hibernation parameters. At the end of the initial wait time period, the page listening time period (i.e., the specified time period which indicates how often the mobile terminal should check for a paging message) can be started. Alternatively, the time value can simply be a time known to both the mobile terminal and the base station, at which the page listening time period begins. Those of ordinary skill in the art will recognize that the hibernation parameters can be expressed in different forms, including but not limited to those described above. As a further alternative, the BS can indicate via the hibernation parameters a predefined paging group, to which the mobile terminal belongs.

From step 310 the BS proceeds to step 312, where it sends the response to the mobile terminal. From step 312 the BS proceeds to step 314. If at step 302 the BS determines that mobile terminal is in fact hibernating, then it proceeds to step 314. If at step 308 the BS has not received a hibernation request from the mobile terminal, then the BS proceeds to step 314.

At step 314, the BS determines whether it has received a capacity request from the mobile terminal. If the BS has not received a capacity request from the mobile terminal, then the BS proceeds to step 322 where it determines whether it has a packet designated for delivery to the mobile terminal. The packet can be, for example, a packet received by the BS from a network to which the BS is connected, or can be a packet generated by the BS for the mobile terminal. If the BS does not have a packet for the mobile terminal, then it proceeds from step 322 back to step 300, where it begins the cycle again. If the BS has received a packet from the network for the mobile terminal, then the BS proceeds from step 322 to step 324, where it determines whether the mobile terminal is hibernating. If the mobile terminal is not hibernating, then the BS proceeds to step 336 where it sends to the packet to the mobile terminal, and then proceeds from step 336 to step 300 to begin the cycle anew. If the mobile terminal is hibernating, then the BS proceeds from step 324 to step 326, where it stores the packet in a buffer. From step 326, the BS proceeds to step 328, where the BS determines whether it is time for the mobile terminal to listen for paging messages, i.e., whether the mobile terminal's specified time period has expired. If the time period has not expired, then the BS remains at step 328 until the time period expires. When the time period expires, the BS moves from step 328 to step 330 where it sends a paging message to the mobile terminal. From step 330 the BS moves to step 332, where it receives a paging acknowledgment signal from the mobile terminal and then proceeds on to step 334, where it transfers the packet buffered in step 326 to the mobile terminal. From step 334, the BS proceeds to step 300, to begin the cycle anew.

If the packet transferred to the mobile terminal in step 334 is a hibernation proposal, as for example in the event the mobile terminal is operating on standing instructions to continue using the same hibernation parameters until instructed otherwise and the BS now wants to change the hibernation parameters, then the BS would proceed from step 334 to step 302, from step 302 to step 304 (where it would not again propose hibernation, since it just did so), and from step 304 to step 308 where it would receive a hibernation request from the mobile terminal in response to the hibernation proposal sent to the mobile terminal in step 334. The BS can then provide new hibernation parameters in steps 310 and 312.

If when at step 314 the BS determines that it has received a capacity request from the mobile terminal, then the BS moves from step 314 to step 316, where the BS assigns an uplink slot to the mobile terminal. From step 316 the BS proceeds to step 318, where the BS sends the uplink slot terminal assignment to the mobile terminal. From step 318 the BS proceeds to step 320, where the BS receives the packet from the mobile terminal. After receiving the packet, the BS proceeds to step 321, where it acts on the received packet by forwarding it on to the network, or making appropriate use of it, depending on the specific purpose and destination address of the packet. From step 321 the BS proceeds to step 300, where the cycle begins anew.

Figure 4:
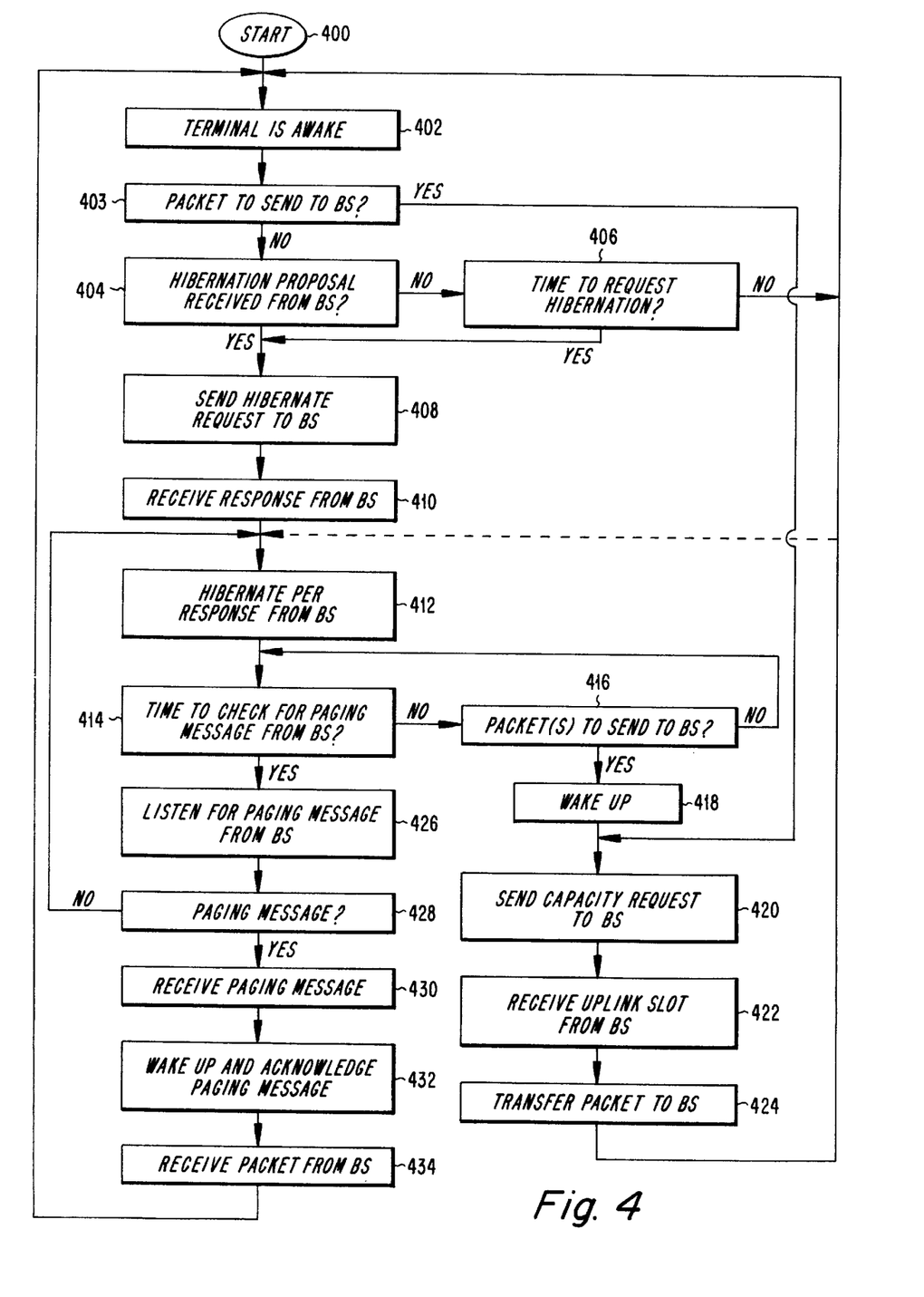
FIG. 4 shows a flow diagram of mobile terminal functions in accordance with an embodiment of the invention.

FIG. 4 illustrates a set of mobile terminal actions that are counterpart to those shown in FIG. 3. Upon starting at step 400, the mobile terminal proceeds to step 402 where the mobile terminal is awake. From step 402, the mobile terminal proceeds to step 403 where it determines whether it has a data packet to send to the BS. If the mobile terminal does not have a data packet to send to the BS, then it proceeds from step 403 to step 404. In step 404, the mobile terminal determines whether it has received a hibernation proposal from the BS. If the mobile terminal has received a hibernation request from the BS, then the mobile terminal proceeds to step 408. If the mobile terminal has not received a hibernation proposal from the BS, then it proceeds to step 406, where it determines whether it is time to request hibernation. If it is not time to request hibernation, then the mobile terminal proceeds from step 406 to step 402, and the cycle begins again. If it is time to request hibernation, then the mobile terminal proceeds to step 408.

At step 408, the mobile terminal sends a hibernation request to the BS. From step 408 the mobile terminal proceeds to step 410, where it receives a response from the BS. From step 410 the mobile terminal proceeds to step 412, where the mobile terminal hibernates in accordance with the response received in step 410 from the BS. From step 412 the hibernating mobile terminal proceeds to step 414, where it determines whether the specified time period (at the end of which it will listen for paging messages) has expired and it is time to listen for paging messages from the BS. If it is time to listen for paging messages, then the mobile terminal proceeds from step 414 to step 426 where it listens for paging messages. From step 426 the mobile terminal proceeds to step 428, where the mobile terminal determines whether there is a paging message. If there is not a paging message, then the mobile terminal proceeds from step 428 to step 412, where it restarts the specified time period and continues hibernating.

If in step 428 the mobile terminal determines that there is a paging message, the mobile terminal proceeds from step 428 to step 430 where it receives the paging message. After receiving the paging message in step 430 the mobile terminal moves to step 432 where it wakes up and acknowledges the paging message by, for example, sending a return message to the BS. When the BS receives the paging message acknowledge signal from the mobile terminal, it considers the mobile terminal to be awake. From step 432 the mobile terminal proceeds to step 434, where it receives a packet from the BS. From step 434 the mobile terminal proceeds to step 402, where the process begins anew.

If at step 414 the mobile terminal determines that it is not yet time to check for paging messages from the BS, then the mobile terminal proceeds from step 414 to step 416, where it determines whether it has a packet of its own to send to the BS. If the mobile terminal does not have a packet to send, then it continues hibernating and returns to step 414 to check again whether it is time to listen for paging messages. If the mobile terminal does have a packet to send to the BS, then the mobile terminal proceeds from step 416 to step 418 where it awakens. From step 418 the mobile terminal proceeds to step 420. If at step 403 the mobile terminal determines that it has a data packet to send to the BS, then it proceeds to step 420. In step 420, the mobile terminal sends a capacity request to the BS. The BS considers the mobile terminal to be awake when it receives a capacity request signal from the mobile terminal. From step 420, the mobile terminal proceeds to step 422 where it receives an uplink slot from the BS. From step 422 the mobile terminal proceeds to step 424, where it transfers the packet to the BS. From step 424, the mobile terminal proceeds to step 402 to begin the cycle anew. Alternatively, as indicated by the dotted line, depending on the most recent set of hibernation instructions received from the BS (in step 410, for example), the mobile terminal can return directly to step 412 from step 424 and re-enter hibernation using the most recent set of hibernation instructions.

If the packet received from the BS in step 434 is a hibernation proposal, then the mobile terminal will proceed from step 434 to step 402, from step 402 to step 404, and from step 404 to step 408 (since the mobile terminal did receive a hibernation proposal, in step 434) where the mobile terminal sends a hibernation request in response to the hibernation proposal received in step 434. From step 408, the mobile terminal proceeds to step 410 where it receives hibernation parameters. Thus, as for example in the event the mobile terminal is operating on standing instructions to continue using the same hibernation parameters until instructed otherwise, the terminal can, for example, receive new hibernation instructions and parameters from the BS using this procedure.

Figure 5:
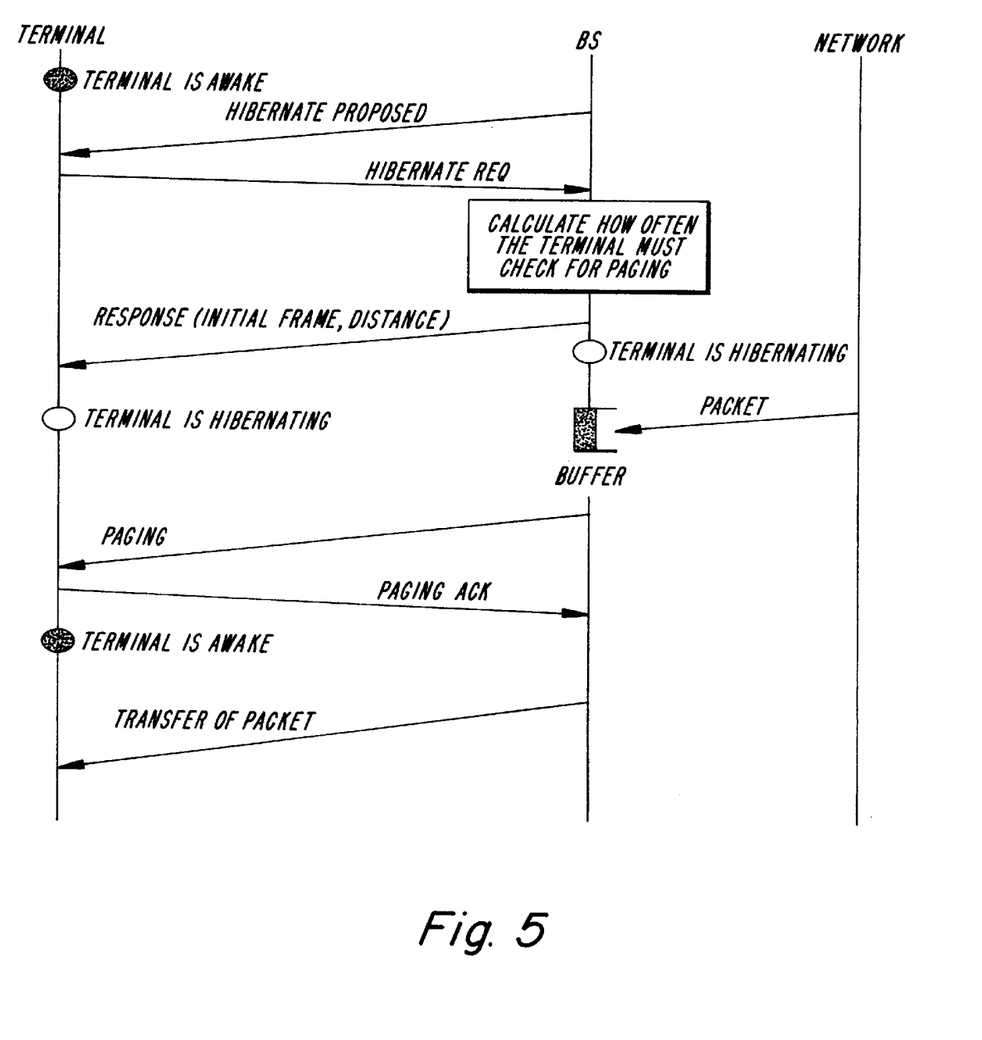
FIG. 5 shows a chart outlining a sequence of interactions between a BS and a mobile terminal, in accordance with an embodiment of the invention.
Figure 6:
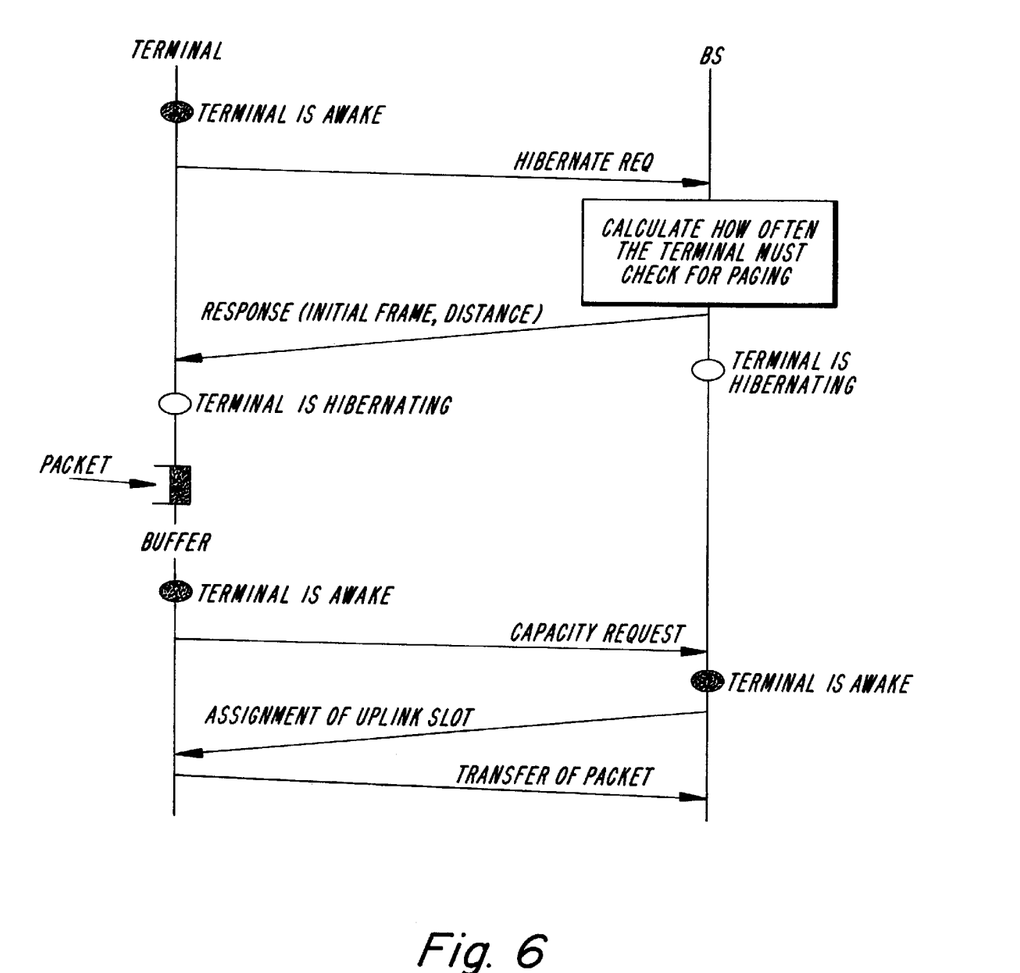
FIG. 6 shows a chart outlining a sequence of interactions between a BS and a mobile terminal, in accordance with an embodiment of the invention.
Figure 7:
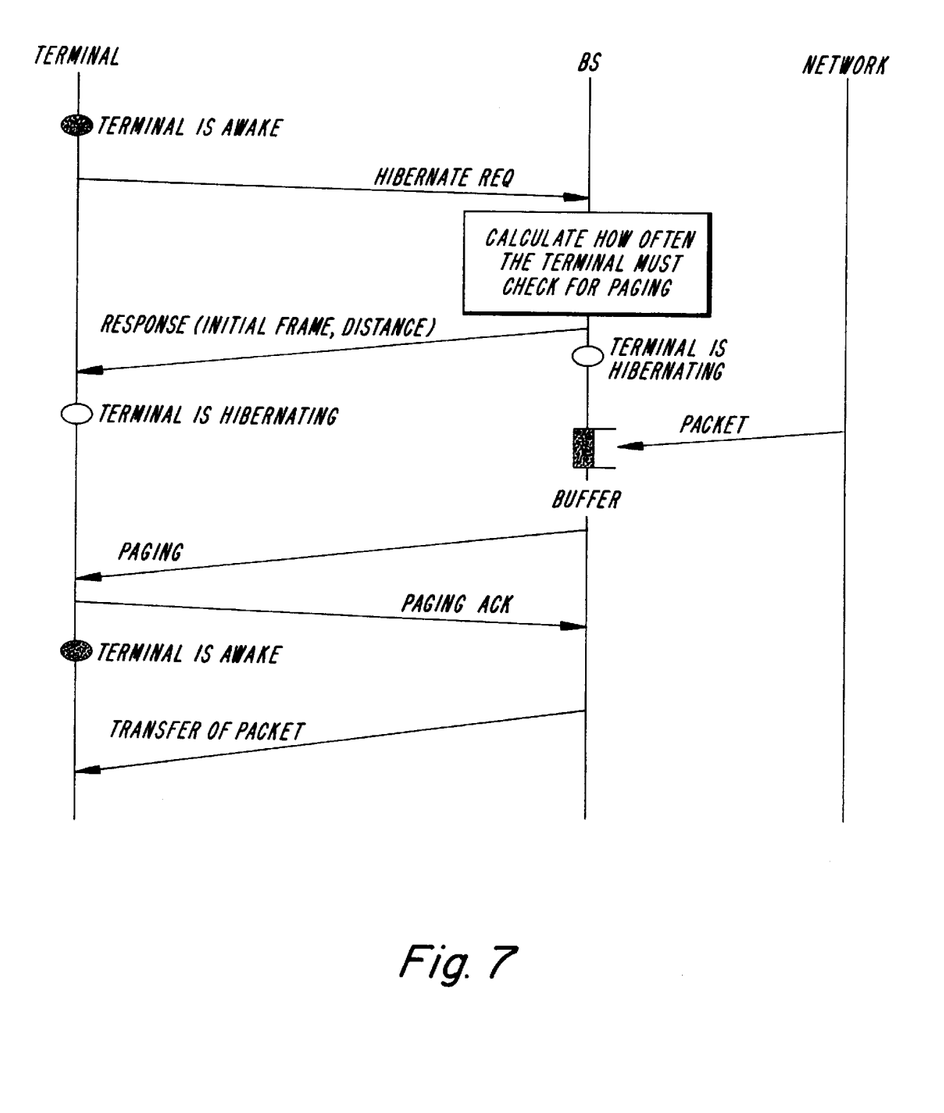
FIG. 7 shows a chart outlining a sequence of interactions between a BS and a mobile terminal, in accordance with an embodiment of the invention.

FIGS. 5–7 further illustrate the functions shown in FIGS. 3–4 and described above. In particular, FIG. 5 shows interactions between the mobile terminal and the BS when the mobile terminal decides to hibernate, and then subsequently when the BS has a packet to transfer to the mobile terminal. FIG. 6 shows interactions between the mobile terminal and the BS when the mobile terminal decides to hibernate, and then subsequently when the mobile terminal decides, during hibernation, to awaken and transfer a packet to the BS. FIG. 7 shows interactions between the mobile terminal and the BS when the BS initiates the process of changing the mobile terminal from awake status to hibernating status, and the subsequently when the BS has a packet to transfer to the mobile terminal.

* In another embodiment of the invention, a mobile terminal can be an ATM terminal with an ATM connection (where, for example, a virtual channel identifier (VCI)=16) established to an ATM network for the purpose of conveying interim local management interface (ILMI) messages. According to the ILMI Specification 4.0 (af-ilmi-0065.000), which is hereby incorporated by reference, an ILMI connectivity message shall be sent every 5 seconds (as a default value), and the message response time shall be less than 1 second for 95% of the messages. To comply with these requirements, a terminal must wake up from the hibernation mode quite often to respond to paging messages.

Figure 12:
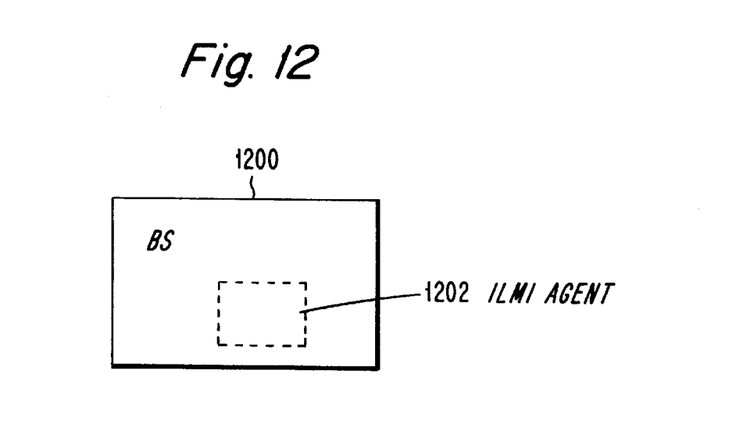
FIG. 12 shows a block diagram of an ILMI agent located within a BS.

To extend a time period in which a hibernating mobile terminal with an established ILMI connection is not required to wake up to communicate with a BS, in this embodiment of the invention an ILMI agent can be provided in the BS. This is shown, for example, in FIG. 12, where an ILMI agent 1202 located within a base station (BS) 1200. This ILMI agent can keep a mirror image of a managed information base (MIB) of the mobile terminal, and on behalf of the terminal it can respond to ILMI messages sent by a network to the mobile terminal. With respect to the network, the ILMI agent complies with response times specified in the ILMI Specification 4.0. The ILMI agent can update its mirror image less often than every 5 seconds, and with a response time longer than 1 second. This allows the mobile terminal to remain hibernating for a time period that is longer than the time period between consecutive ILMI connectivity messages.

Figure 11:
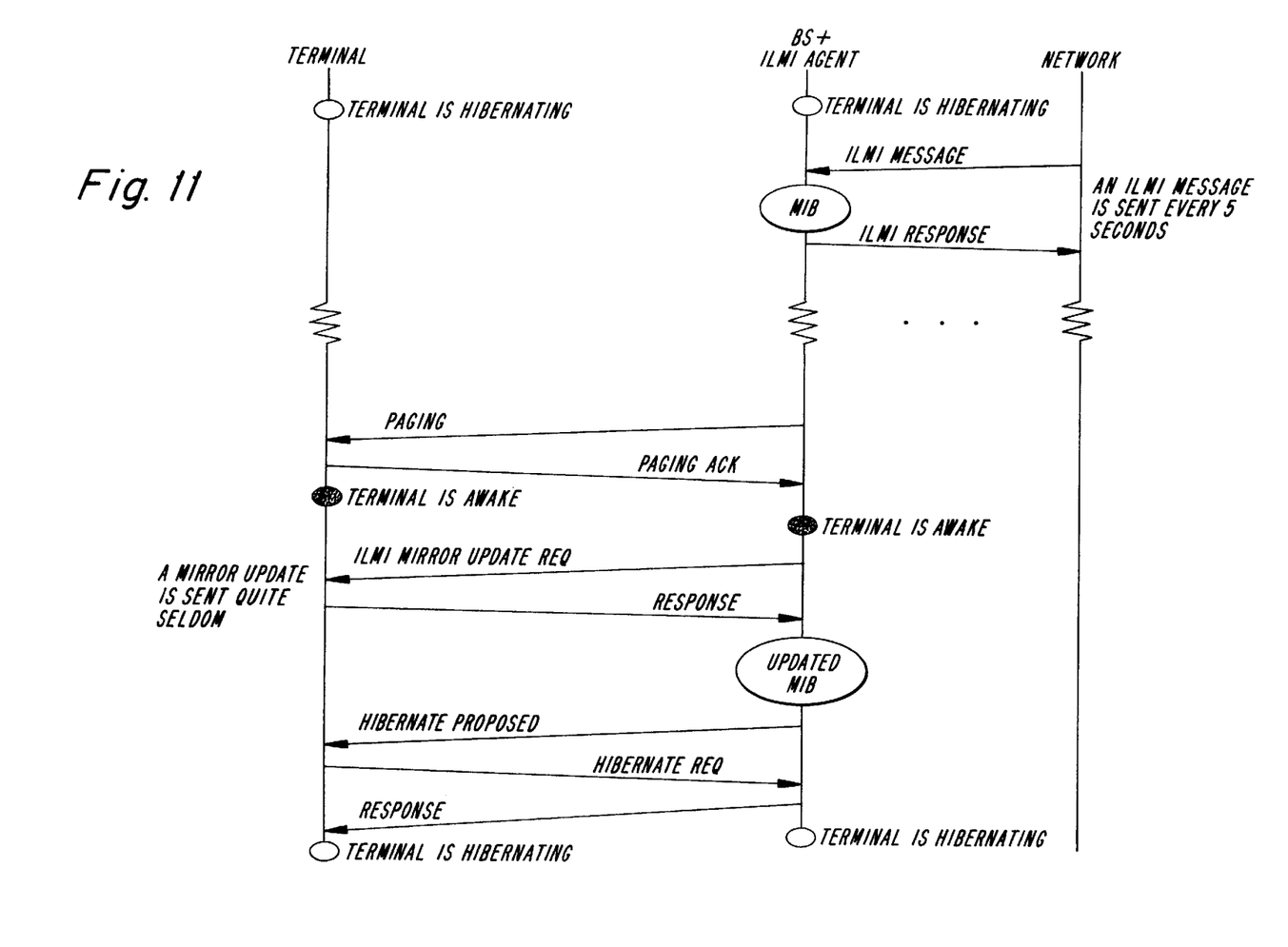
FIG. 11 shows a chart outlining a sequence of interactions between a BS and a mobile terminal, in accordance with an embodiment of the invention.

FIG. 11 shows various interactions between the mobile terminal, the ILMI agent, the BS, and the network. In particular, FIG. 11 shows how the ILMI agent exchanges ILMI messages with the network while the mobile terminal is hibernating, and shows how the ILMI agent can obtain updated information for the MIB from the mobile terminal. Corresponding functions of the BS are shown in the flow chart of FIG. 8.

Figure 8:
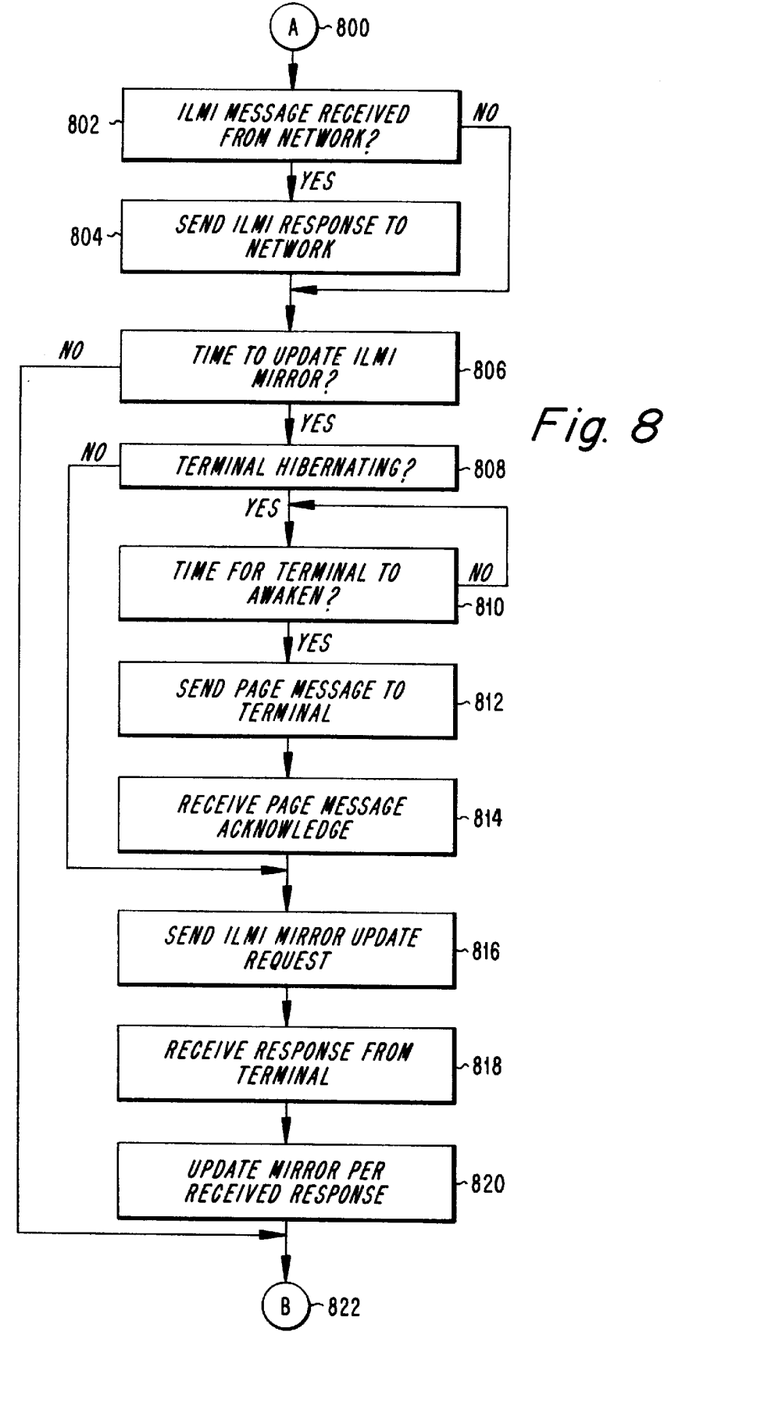
FIG. 8 shows a flow diagram of BS functions in accordance with an embodiment of the invention.

The flowchart sequence shown in FIG. 8 can, for example, be inserted into the flowchart sequence of FIG. 3, between steps 300 and 302, so that steps 800 and 822 in FIG. 8 correspond respectively to steps 300 and 302 of FIG. 3. In step 802, a BS having an ILMI agent determines whether an ILMI message has been received from the network. If yes, then the BS proceeds to step 804, where the BS sends an appropriate ILMI response to the network, using the ILMI agent. From step 804 the BS proceeds to step 806. If at step 802 the BS determines that an ILMI message has not been received, then the BS proceeds to step 806.

At step 806, the BS determines whether it is time to update the ILMI's Mirror (i.e., the ILMI's mirror image of the MIB for the mobile terminal). If it is time to update the Mirror, the BS proceeds to step 808, where the BS determines whether the mobile terminal is hibernating. If the mobile terminal is hibernating, then the BS proceeds from step 808 to step 810, where the BS determines whether it is time for the mobile terminal to awaken. If it is not time for the mobile terminal to awaken, then the BS continues to revisit step 810 until it is time for the mobile terminal to awaken. When the BS determines that the mobile terminal is awake, it proceeds from step 810 to step 812 where it sends a page message to the mobile terminal. From step 812 the BS proceeds to step 814, where the BS receives a page message acknowledge from the mobile terminal. From step 814 the BS proceeds to step 816. If at step 808 the BS determines that the mobile terminal is not hibernating, then the BS proceeds directly from step 808 to step 816.

At step 816 the BS sends an ILMI Mirror update request to the mobile terminal. From step 816 the BS proceeds to step 818, where the BS receives a response from the mobile terminal to the BS's ILMI Mirror update request. From step 818 the BS proceeds to step 820, where it updates the ILMI Mirror in accordance with the information received from the mobile terminal in step 818. From step 820, the BS proceeds to step 822. If at step 806 the BS determines that it is not time to update the ILMI Mirror, then the BS proceed directly from step 806 to step 822.

Generally, an ILMI response can be sent using the ILMI Mirror only when the the mobile terminal is hibernating, so that when the mobile terminal is not hibernating the BS will transfer an ILMI message from the network directly to the mobile terminal, which will then respond with a message which the BS can relay to the network. The message from the mobile terminal can also be used to update the ILMI mirror. Alternatively, the ILMI mirror can be used always, both when the mobile terminal is awake and when it is hibernating, and can be periodically updated as described above with respect to FIG. 8.

Figure 9:
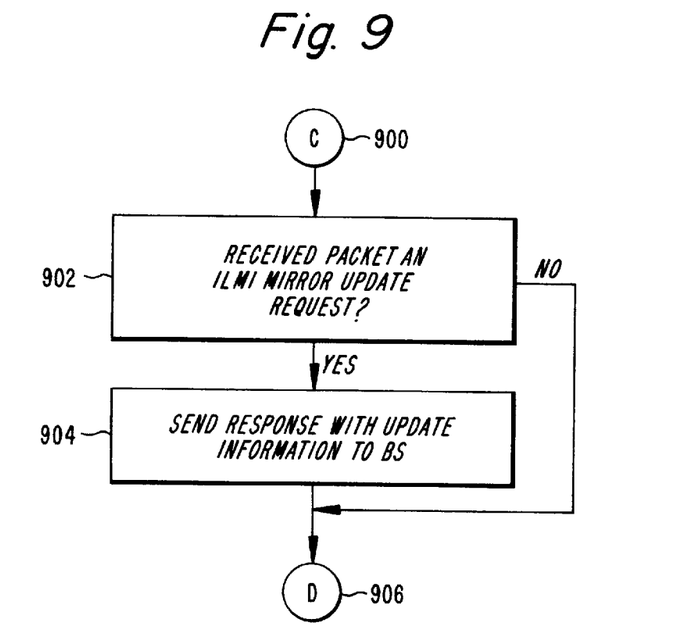
FIG. 9 shows a flow diagram of mobile terminal functions in accordance with an embodiment of the invention.

FIG. 9 illustrates a set of mobile terminal actions that are counterpart to those shown in FIG. 8. The flowchart sequence shown in FIG. 9 can, for example, be inserted into the flowchart sequence of FIG. 4, between steps 434 and 400, so that steps 900 and 906 in FIG. 9 correspond respectively to steps 434 and 400 of FIG. 4. In step 902, the mobile terminal determines whether a packet it has received from the BS is an ILMI Mirror update request. If yes, then the mobile terminal proceeds to step 904 where it sends a response back to the BS with update information for the ILMI Mirror. From step 904, the mobile terminal proceeds to step 906. If at step 902 the mobile terminal determines that the received packet is not an ILMI Mirror update request, then the mobile terminal proceeds directly from step 902 to step 906.

Figure 10:
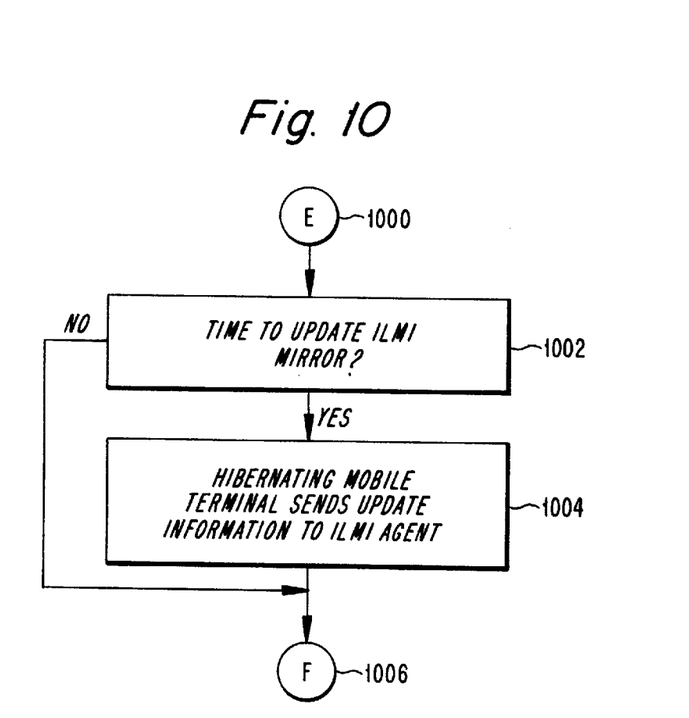
FIG. 10 shows a flow diagram of mobile terminal functions in accordance with an embodiment of the invention.

Alternatively, instead of having the BS ask the mobile terminal for an ILMI Mirror update, the hibernating mobile terminal can automatically send update information or an update report to the ILMI agent as specified time intervals. The time intervals can, for example, be part of the hibernation instructions originally received by the mobile terminal from the BS. In particular, the procedure shown in FIG. 10 can be used, where at step 1002 the hibernating mobile terminal determines whether it is time to send an update report to the ILMI agent. If it is time to send an update report, then the mobile terminal proceeds to step 1004 where it sends the update report to the ILMI agent. The sequence shown in FIG. 10 can be substituted for the sequence shown in FIG. 9, and for steps 806–818 of FIG. 8.

As those of ordinary skill in the art will appreciate, the improvement in power savings achieved using an ILMI agent within the BS is also valid for any other kind of regular connectivity test mechanism or procedure. For example, if a network uses regular ping messages (heart beats), a ping agent in the BS can be used to relieve the mobile terminal of the requirement of having to respond to every ping message.

Those of ordinary skill in the art will also appreciate that the flowcharts described above assume successful communications between the mobile terminal and the base station, and do not show exception cases for handling various kinds of errors that can arise. Such exception cases can be determined and incorporated into the various embodiments described above in accordance with principles and techniques that are well known within the art.

In summary, exemplary embodiments of the invention enable a mobile terminal to sleep for long periods of time, i.e., to hibernate, with established connections. In the case of connections with bursty traffic characteristics or low bandwidth (e.g., long periods of time between data packet exchanges), the mobile terminal can enter a power-saving hibernation mode to conserve battery power. In accordance with exemplary embodiments of the invention, the BS defines a time period at the end of which a hibernating mobile terminal will listen for paging messages from the BS. Allowing the BS to specify the time period enables the system to most efficiently use existing assets such as BS buffer capacities while maintaining accurate communications with minimal loss of data and minimal time delays, in accordance with different requirements that can be encountered in specific applications or situations. In addition, an ILMI agent can further reduce mobile terminal power consumption in systems that require frequent connectivity tests.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for reducing power consumption in a first mobile terminal having an established wireless communication connection with a base station, comprising the steps of:

sending a hibernation request from the first mobile terminal to the base station;

determining a hibernation request response, the response comprising a parameter indicating a length of a time period;

sending the hibernation request response from the base station to the mobile terminal;

changing the first mobile terminal from an awake state to a hibernation state in accordance with parameters in the hibernation request response;

beginning the time period when changing to the hibernation state;

listening for paging messages from the base station at the end of the time period;

determining when the first mobile terminal is in the hibernation state;

buffering at least one data packet at the base station for later transfer to the first mobile terminal while the first mobile terminal is in the hibernation state;

receiving a paging message from the base station at the first mobile terminal when the first mobile terminal is listening for paging messages;

changing the first mobile terminal from the hibernation state to the awake state when receiving the paging message;

receiving a paging acknowledgment signal from the first mobile terminal at the base station;

in response to the base station receiving the paging acknowledgment signal, recognizing that the first mobile terminal has changed to the awake state;

transferring the buffered at least one data packet from the base station to the first mobile terminal in response to the paging acknowledgment signal.

2. The method of claim 1 further comprising the steps of:

sending a capacity request from the first mobile terminal to the base station;

automatically changing the first mobile terminal from the hibernation state to the awake state when sending the capacity request;

recognizing that the first mobile terminal has changed to the awake state when receiving the capacity request at the base station;

receiving an uplink slot assignment from the base station at the first mobile terminal; and sending a data packet from the first mobile terminal to the base station via the assigned uplink slot.

3. A method for reducing power consumption in a first mobile terminal having an established wireless communication connection with a base station, comprising the steps of:

sending a hibernation request from the first mobile terminal to the base station;

determining a hibernation request response, the response comprising a parameter indicating a length of a time period;

sending the hibernation request response from the base station to the mobile terminal;

changing the first mobile terminal from an awake state to a hibernation state in accordance with parameters in the hibernation request response;

beginning the time period when changing to the hibernation state;

listening for paging messages from the base station at the end of the time period;

determining when the time period has expired;

upon expiration of the time period, determining whether a paging message from the base station is present;

receiving the paging message at the first mobile terminal when it is determined that the paging message is present;

acknowledging the paging message with an acknowledgment signal;

changing the first mobile terminal from the hibernation state to the awake state when acknowledging the paging message;

recognizing that the first mobile terminal has changed to the awake state when receiving the acknowledgment signal at the base station; and receiving at least one data packet from the base station.

4. The method of claim 3, further comprising the steps of keeping the first mobile terminal in the hibernation state when it is determined that no paging messages are present and the time period has expired, and restarting the time period.

5. The method of claim 4, further comprising the step of periodically sending a report from the mobile terminal to the base station while the mobile terminal remains in the hibernation state.

6. A method for reducing power consumption in a first mobile terminal having an established wireless communication connection with a base station, wherein the base station is connected to a network that periodically sends connectivity test messages to the first mobile terminal, and the base station includes an agent having a database that mirrors a managed information base of the first mobile terminal, the method comprising the steps of:

sending a hibernation request from the first mobile terminal to the base station;

determining a hibernation request response, the response comprising a parameter indicating a length of a time period;

sending the hibernation request response from the base station to the mobile terminal;

changing the first mobile terminal from an awake state to a hibernation state in accordance with parameters in the hibernation request response;

beginning the time period when changing to the hibernation state;

listening for paging messages from the base station at the end of the time period;

intercepting a connectivity test message from the network intended for the first mobile terminal;

replying to the connectivity test message using the agent;

requesting updated information regarding the first mobile terminal;

receiving updated information from the first mobile terminal; and updating the agent database using the received updated information.

7. The method of claim 6, wherein the step of updating the agent database is performed less often than the step of receiving the connectivity test message.

8. A method for reducing power consumption in a first mobile terminal having an established wireless communication connection with a base station, wherein the base station is connected to a network that periodically sends connectivity test messages to the first mobile terminal, and the base station includes an agent having a database that mirrors a managed information base of the first mobile terminal, the method comprising the steps of:

sending a hibernation request from the first mobile terminal to the base station;

determining a hibernation request response, the response comprising a parameter indicating a length of a time period;

sending the hibernation request response from the base station to the mobile terminal;

changing the first mobile terminal from an awake state to a hibernation state in accordance with parameters in the hibernation request response;

beginning the time period when changing to the hibernation state;

listening for paging messages from the base station at the end of the time period;

intercepting a connectivity test message from the network intended for the first mobile terminal;

replying to the connectivity test message using the agent;

determining whether it is time to send updated information regarding the first mobile terminal to the agent;

when it is time to send updated information regarding the first mobile terminal to the agent, automatically sending the updated information from the mobile terminal to the agent; and updating the agent database using the received updated information.

9. The method of claim 8, wherein the step of automatically sending is performed less often than the step of receiving the connectivity test message.

* * * * *